US006181802B1

(12) United States Patent
Todd (10) Patent No.: US 6,181,802 B1
(45) Date of Patent: Jan. 30, 2001

(54) METHOD AND APPARATUS FOR CODING INFORMATION BY INSERTING CODES IN STRONGLY FEATURED IMAGE REGIONS

(75) Inventor: Martin Peter Todd, Uxbridge (GB)

(73) Assignee: Central Research Laboratories Limited, Middlesex (GB)

( * ) Notice: Under 35 U.S.C. 154(b), the term of this patent shall be extended for 0 days.

(21) Appl. No.: 08/875,546

(22) PCT Filed: Feb. 5, 1996

(86) PCT No.: PCT/GB96/00246

§ 371 Date: Oct. 17, 1997

§ 102(e) Date: Oct. 17, 1997

(87) PCT Pub. No.: WO96/25005

PCT Pub. Date: Aug. 15, 1996

(30) Foreign Application Priority Data

Feb. 6, 1995 (GB) .................................. 9502274

(51) Int. Cl.[7] ..................................................... G06K 9/00
(52) U.S. Cl. .................................................... 382/100
(58) Field of Search ................... 382/100, 232; 380/54

(56) References Cited

U.S. PATENT DOCUMENTS 5,721,788 * 2/1998 Powell et al. ................... 382/100
5,848,155 * 12/1998 Cox ................................ 380/4

FOREIGN PATENT DOCUMENTS

| 0 581 317 | 2/1994 | (EP) | G07D/7/00 |
| WO 89/08915 | 9/1989 | (WO) | G11B/20/11 |
| WO 95/14289 | 5/1995 | (WO) | G06K/19/14 |
| WO 95/20291 | 7/1995 | (WO) | H04N/1/32 |

OTHER PUBLICATIONS

Hara et al., "An Improved Method of Embedding Data into Pictures by Modulo Masking," *IEEE Trans. on Communications*, vol. 36, No. 3, Mar. 1988, pp. 315–331.*
Bender et al., "Techniques for Data Hiding," *Proc. of the SPIE: Storage and Retrieval for Image and Video Databases, III*, vol. 2420, Feb. 1995, pp. 164–173.*
Szepanski, "A Signal Theoretic Method for Creating Forgery–Proof Documents for Automatic Verification," *1979 Carnahan Conf. on Crime Countermeasures*, May 1979, pp. 101–109.*
Cox et al., "A Secure, Imperceptable yet Perceptually Salient, Spread Spectrum Watermark for Multimedia," *Proc. of the 1996 Southcon Conf.*, pp. 192–197, 1996.*

* cited by examiner

Primary Examiner—Andrew W. Johns
(74) Attorney, Agent, or Firm—Evenson, McKeown, Edwards & Lenahan, P.L.L.C.

(57) ABSTRACT

A method of encoding invisible identification code into an image, which is highly resistant to degradation across communications links, and which does not require the presence of the original image for decoding, comprises analyzing the image and determining strongly featured regions such as edges, and inserting code into such regions by altering the structure of the image in a predictable manner, as for example a concave elliptical insert centered on and aligned with an edge, which alteration is not visible to the eye. When decoding, area of concavity are determined, and a correlation is performed with a predicted insert function to assess whether code has been inserted. A hardware embodiment is described.

32 Claims, 8 Drawing Sheets

METHOD AND APPARATUS FOR CODING INFORMATION BY INSERTING CODES IN STRONGLY FEATURED IMAGE REGIONS

BACKGROUND AND SUMMARY OF THE INVENTION

The present invention relates to a method and apparatus for the insertion, and subsequent decoding, of coded information into images.

It is known to insert codes into images for example video transmissions or video clips or stills transmitted across a telecommunication link, for the purpose of identifying the owner of the images. There are a number of known schemes for inserting identification codes into the sync periods, and more recently it has been proposed to insert identification codes into the image itself, but in such a manner that the code cannot be detected by the eye.

All of the schemes heretofore proposed suffer from the disadvantage that low pass filtering and other processes such as data compression, which may occur in image compression algorithms or transmission across a telecommunication link may remove the code or degrade it to an extent where it cannot be recognised.

EP-A-0581317 discloses a scheme wherein relative extrema of intensity within the image are detected and the intensity values are modified by a certain amount. This provides a large number of sites within the image and a signature is created by modifying the value of intensity at selected sites. Although it is claimed that this method is resistant to certain types of image processing, nevertheless a more robust scheme for transmission e.g. broadcasting is desirable. Further, a disadvantage with this method is that in order to recover the encoded digital signature, it is necessary to have to hand the original image; this severely limits the application of the method.

WO 95/14289, published on May 26, 1995, discloses the embedding of an identification code throughout an image by modulating a digitised version of the image with a small noise signal. The specific system described suffers from the disadvantage of requiring to hand the original image for code identification. Further improvements in code robustness for transmission over telecommunications links or broadcasting are also desirable.

WO 95/20291, published on Jul. 27, 1995, discloses a method of hiding copyright related messages with a digital data work, which relies on commonly occurring patterns or sequences of data in the work acting as signposts to target data elements which are modified according to certain rules. The disclosed method suffers from a lack of robustness to signal degradation.

All of the above references suffer from a disadvantage that they are concerned wholly or principally with the digital domain, and the disclosed techniques are not suited to the analog domain, in particular where digital to analog conversion and analog to digital conversion may easily lose or degrade individual pixel values.

WO 89/08915 discloses an invasive coding technique in which insignificant digits of recorded material are replaced with a code digit from an independent sequence. WO 90/09663 discloses a non-invasive technique wherein data words are identified according to predetermined criteria and a unique identifying pattern is created therefrom. Neither of these techniques is well suited to practical use such as in broadcasting applications.

An object of the present invention is to provide a highly robust method of encoding information into an image, which is highly resistant to image manipulation and degradation and is effective equally in analog and digital domains.

The present invention is based in one aspect on the realisation that coded information may be inserted into an image in strongly featured regions of the image in such a way that the code is resistant to image compression and/or low pass filtering such as may occur in transmission over telecommunication links, but is not visible to the eye, and furthermore the code does not require for decoding the presence of the original image.

In a first specific aspect, the invention provides a method for inserting coded information into an image, comprising analysing the image, identifying strongly featured regions and inserting coded information into these regions.

By strongly featured regions is meant, for the purposes of this specification, regions of primary strength to which the eye responds in viewing an image for example textured regions or lines or boundaries between two regions of different luminance, wherein in such regions, it is possible to insert a relatively large amount of information without significantly altering the image in its appearance to the eye; such regions will be referred to herein as "strongly featured region(s) as defined herein". It is possible in some applications in order for an adequate prospect of decoding the code, that the code is inserted at an intensity which may risk some visible artefact; nevertheless the present invention always permits the possibility of completely invisible code insertion.

Because the method of the invention relies on an analysis of the entire image and code being inserted in strongly featured regions rather than in individual pixels as in the prior art, the code is better able to survive analog to digital conversions and digital to analog conversions, where there will inevitably be pixel misalignments. between the original and processed images, and hence the pixel values will be apparently altered.

As preferred, edge regions between areas of different luminance are employed since these are very distinctive and will permit code insertion without visibly degrading the image. However, edge regions between areas of different chrominance may alternatively or in addition be employed. In a further preferred form, textured regions may be employed as will hereinafter be described.

As preferred, the coded information is inserted into strongly featured regions by altering the structure of the image in such region in a predictable or identifiable manner. The structure of the image may be altered by inserting a distinct subimage, for example a rectangular bar or ellipse along the length of an edge region. Alternatively and as preferred, the image is altered by applying an insert function to an area including the strongly featured region, which insert function gradually decreases in intensity from the centre of its region of application, so as to blend with the surrounding region.

A main advantage of applying the coded information by altering the image in a predictable or identifiable manner is that the information can be recovered in a decoding process at a remote location without having the original to hand. Thus, upon decoding, the image is analysed and a search is made for any feature resembling the structural alteration. If one or more features can provisionally be identified, then such features can be regarded as coded information; as preferred a "confidence factor" may be attached to each detected feature denoting the degree of reliability of the identification.

Prior to inserting the information, the image is preferably analysed to determine at least one masking threshold or masking parameter which provides a measure of by how much the structure of the image may be altered without risking the coded information becoming visible. If such threshold or parameter is sufficient to enable insertion of coded information of sufficient intensity to permit decoding, the coded information is inserted at a level determined by the masking parameter or threshold.

Thus as preferred an assessment is made of the strength or energy of the strongly featured regions within the image, in order to determine the permissible strength of insertion. This assessment value is employed to appropriately scale the insert function as it is inserted into the image. Further masking thresholds may be provided by assessing whether the image is suitable for code insertion, for example the degree of consistency of the edge, the definition of the edge centre, and the strength to prevent insertions when the image is determined to be unsuitable.

Thus in a more specific aspect, the invention provides a method for inserting coded information into an image, comprising analysing the image, identifying strongly featured regions, determining for at least one such region a masking parameter, and inserting coded information into such region in a predictable or identifiable manner by an amount determined by said masking parameter.

As preferred the coded information is inserted into an edge region by varying the luminance intensity in a local area, along the length of an edge, for example, by applying over the area a luminance intensity having a non-linear contour, for example a concave or convex function, which is aligned with the edge. A function applied in this way may represent a digital "1" or "0" according to whether it is concave or convex (for the purposes of this specification, where the terms concave, concavity and concaveness are used, they are to be understood as including convexity, which may be regarded as concavity with a negative radius of curvature). Such a method is very resistant to signal degradation arising for example from image compression. Other methods of encoding may be envisaged for example applying a non-linear function which varies perpendicular to the edge.

For textured regions, an example of which is a carpet with several colours distributed at random in the carpet fibre, a code would be inserted by first performing a statistical cluster analysis on the image to identify regions which consist of two or more basic values which are randomly distributed. The most intense "foreground" value is determined, and a circular function, appropriately scaled by a suitable masking parameter, centred in the textured region and gradually diminishing to zero radially, is applied to the foreground pixels to modulate their intensities. In the decoding process, a similar analysis is applied to the image, and the set of foreground pixels in each textured region is analysed to assess whether such circular function has been applied.

As preferred, the image, e.g. a video frame or field, is divided up into a number M×N of blocks in M rows and N columns, each block comprising n×n pixel elements (e.g. 8×8). Strongly featured regions are searched in each block for insertion of code. In order to encode a significant amount of information into an image, it is necessary to apply the insertion function to a number of featured regions, say edges, in the image. If for example, one edge is chosen in each block into which the image is divided, then in order to increase confidence when attempting to recognise the code, the edges in one row may be encoded according to two separate pseudo-random codes, representing a "1" or "0".

Thus when an image is scanned for a code, the insertion function in each block may or may not be located with a degree of confidence. The identified functions for a row of blocks, with appropriate confidence weighting factors, are compared with the pseudo-random codes to derive a "1" or "0" with a much higher confidence factor.

However as preferred and as an alternative to relying on rows of blocks, each row representing one bit, the various blocks which together represent one bit, may be distributed throughout the image according to a further predetermined code. Thus, when decoding an image, knowledge of the predetermined code enables the blocks to be grouped together for analysis with the pseudo random codes to determine the value of the bit. This method has the advantage that areas where no edges occur, for example background regions of sky, can be avoided.

Although two pseudo random codes of ones and zeros are preferred for decoding data, other pseudo random codes may be employed. For example, a single pseudo random code may be employed where a watermarking type code is required indicating ownership of the image. Other types of code may also be employed.

A problem with dividing an image into a number of blocks occurs in decoding the image, since if there are only a few edges in the image and many blocks without an edge, it is difficult to maintain synchronisation with the encoding process.

As a means of overcoming this problem, the video synchronisation process may be altered so that synchronisation occurs at the start of each row or line of blocks; if then as described above, each row represents a single bit of information, a secure method of coding is provided. One means of providing synchronisation information, for example, where video images are employed, is to use the line sync pulses as a method of synchronisation. As an alternative, a very low frequency modulation may be applied to an entire image (for example a digitised still photograph image) so that there is provided a part of a cycle or one or two cycles of a low frequency modulation across the width and/or height of the image to enable centering of the decoding process onto this low frequency modulation, in a manner somewhat analogous to an archer's target. In any event, the decoding stage will automatically align to the reception of digital information to permit the required synchronisation.

In regions of the image where there does not occur strong features, for example background regions, it may be desired to insert a code in the form of a region of fixed or variable luminance, for example a circle which although relatively large in size, is not visible to the eye. This ensures that coding information is present in all parts of an image for robustness of transmission and decoding.

In a further specific object therefore the present invention provides a method of coding information into an image, dividing the image in M×N blocks in N rows and M columns, and inserting into selected blocks code information of one of a plurality of types, the type of code inserted depending on an assessment of the image features in the respective block.

The present invention also extends to a method of decoding, and according the invention provides in a further aspect a method of decoding information contained in an image, the method comprising analysing the image, identifying strongly featured regions, determining for at least one such region an anticipated insertion of coded information, and correlating such anticipated insertion with the image to determine whether there has been inserted into the strongly featured region coded information.

As preferred in the decoding method, similar processing steps are carried out as in the encoding method, involving analysing the image and defining an anticipated insertion function, as will become clear in the description of the preferred embodiment.

The present invention also extends to apparatus for carrying out any of the aforesaid aspects of the invention.

The information encoded into an image may be used for a variety of purposes, for example as follows:

to insert copyright or identification information in video clips or films;
  to insert copyright or identification information into stills;
  to log when adverts or films are played in broadcasts, for monitoring purposes;
  to identify the master copy from which pirated videos are copied.

The information encoded may represent coding information which initiates operations within the decoding apparatus, or provides specific identification information, for example copyright information with the name of the copyright owner etc. Alternatively, the information may be merely analogous to a watermark, serving merely to identify the source of the image information but not being specific to the particular image.

BRIEF DESCRIPTION OF THE DRAWINGS

A preferred embodiment of the invention will now be described with reference to the accompanying drawing wherein:

FIGS. 1 to 7 are diagrams for explaining the preferred method of the present invention, of which

DESCRIPTION OF THE PREFERRED EMBODIMENT

In accordance with a preferred embodiment of the invention, there is hidden local insertions in edges within the image. Edge regions are known to have masking properties because of the way the human visual system works. In particular the local orientation of the edges are important, and there are specific structures in the primary visual cortex for detecting both the presence of an edge and its local orientation (to a resolution of about 32 different orientations).

The insertions are such that they do not alter the local orientation. They must also survive low pass filtering since this is a common process for images. The insertions are made along the length of a local section of edge, and make the grey level gradient along the direction of the edge either a concave or a convex function over the distance of the insertion i.e. travelling from the start to the end point of the insertion along the direction of the edge of the grey level is either greater or less than would be expected by a simple linear interpolation from the start and end points. One important point of this is that at the start and end points the grey level must return to the value of the original image in order to prevent any propagation of the distortion, or any discontinuities.

The insertions are made as a 2D function, by using an ellipse which is aligned to the local orientation. The ellipse has a cross sectional function which is a ½ cycle of a cos function and is used to weight the extent of the insertion, i.e. outside the ellipse no insertion is made, within it the insertion is weighted by the cos function. This gives the concave or convex function by adding or subtracting it to the image. The magnitude of the insertion can be varied according to the amount of activity in the block; for a high activity block a stronger insertion can be buried. It is not always possible to produce the required function; a block which already has a very strong convex function may require the insertion to be very large to convert it to a concave one, and this may produce a visible artefact. This is one of the reasons for using an accumulation of a number of blocks to produce a single bit (see below).

The size of the insertions and their positions are fixed by processing the image in a block by block manner, typically with a block size of 8 by 8 pixels.

There may be insufficient edge blocks within an image to generate a consistent result, particularly since the selection of these edge blocks may be inconsistent when the images are processed. This can lead to problems in keeping the decoding process in synchronisation with the encoding process, such that the correct blocks were used to determine each bit.

To overcome this, the synchronisation process is aligned to the start of a line of blocks. Thus all the blocks within the first line of blocks are used to encode/decode the first bit. Then all the blocks within the second line would encode/decode the second bit etc. This may be extended so that a number of lines are used to encode/decode each bit, which reduces the amount of information which could be inserted but improves the robustness to processing.

In a modification and as preferred, a group of blocks contributing to a single bit may be distributed throughout an image according to a predetermined code. This has the advantage as compared with a line of blocks contributing to a bit, that the blocks may be sited where strongly featured regions occur, and are not located for example in a background region with no strong features.

A Pseudo Random Sequence (PRS) is used to improve the accumulation of results from the individual blocks to determine a single bit. The PRS consists of a random but fixed sequence of +1 or −1's. +1 means that the insertions is added to produce a convex functions, −1 means that it is subtracted to produce a concave function. For the encoding process, each block is processed in turn, and the next element in the PRS determines whether the insertion is added or subtracted. There are two different sequences, one for the 1 data bit and one for the 0 data bit. Thus for the decoding process the concave/convex-ness of each block is correlated with both sequences, and the sequence which produces the highest correlation determines whether what the decoded data bit is.

A second method of coding is to code low-pass regions as well as edge regions. The low-pass regions are coded with circular insertions centred on the block. The insertions in this case are of a fixed strength, and not related to the activity in the block. This improves the robustness of the process.

The encoding and decoding algorithms are listed below as a sequence of steps:

Encoding Algorithm
1) split the frame into adjacent blocks each of n*n pixels
2) calculate the dominant orientation in each block
3) calculate the amount of activity in each block
4) calculate the consistency of the dominant orientation
5) to encode one data bit process each block within a predefined set of blocks distributed throughout the image, as follows:
   5a) look up the next element of the PRS for the data bit
      1) if it is a 1 set up add
      2) if it is a −1 set to subtract
   5b) segment the blocks in the following categories
      a) a single edge/line in a dominant orientation
      b) a low activity block
      c) several major lines or edges
   5c) process the blocks as follows:-
      a) add/subtract an elliptical function
         a1) centred on the edge
         a2) aligned to the block orientation
         a3) scaled by the activity in the block
      b) add/subtract a circular function
         b1) centred on the centre of the block
         b2) fixed strength
      c) no insertion
6) repeat step 5) until all the bits are encoded.

Decoding Algorithm
1) split the frame into adjacent blocks each of n*n pixels
2) calculate the dominant orientation in each block
3) calculate the amount of activity in each block
4) calculate the consistency of the dominant orientation
5) to decode one data bit process each block within the predefined set of blocks distributed throughout the image, as follows:
   5a) segment the blocks in the following categories
      a) a single edge/line in a dominant orientation
      b) a low activity block
      c) several major lines or edges
   5b) process the blocks as follows:-
      a) calculate the concave/convex-ness of an elliptical function
         a1) centred on the edge
         a2) aligned to the block orientation
         a3) scaled by the activity in the block
      b) calculate the concave/convex-ness of a circular function
         b1) centred on the centre of the block
         b2) fixed strength
      c) do nothing
   5c) correlate the convex/concave-ness of the block with the next element of the data bit 1 PRS and accumulate the result.
   5d) correlate the convex/concave-ness of the block with the next element of the data bit 0 PRS and accumulate the result.
6) compare the data bit 1 accumulated correlation with the data bit 0 accumulated correlation. The larger of the two is the decoded data bit. The size of the correlation is the confidence in the result. 7) repeat steps 5) and 6) for each data bit.

Referring now to FIGS. 1 to 8, the algorithmic steps listed above will now be explained in detail.

Figure 1:
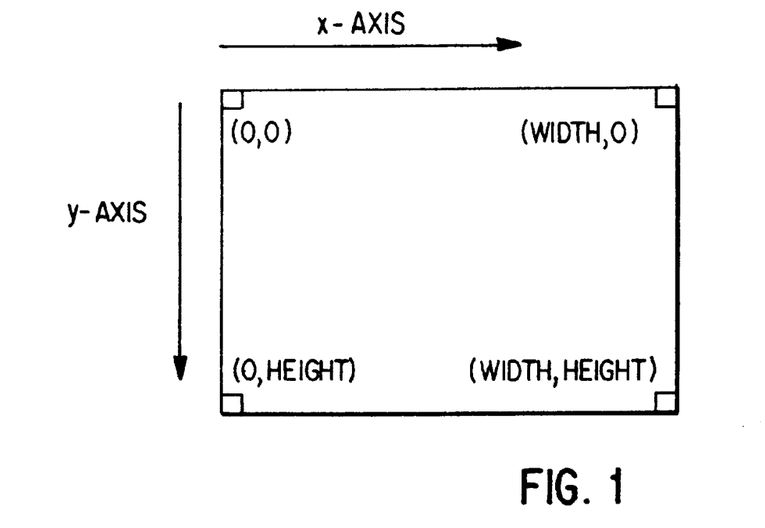
FIG. 1 illustrates the frame axis conventions used to describe the mathematics in accordance with the present invention.

The frame axis conventions used to describe the mathematics are shown in FIG. 1. A pixel is defined by its coordinates (x,y) and its luminance value is r(x,y). Note that the top left pixel of an image is the (0,0) pixel, and that the y axis has its positive direction down the frame.

Figure 2:
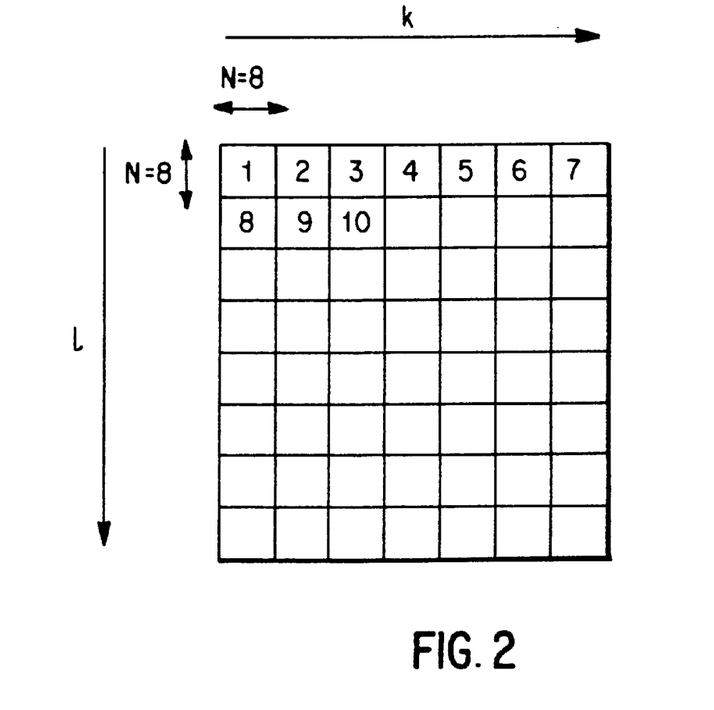
FIG. 2 illustrates the frame being segmented into non-overlapping blocks, each block being of size n by n pixels.

As shown in FIG. 2, the frame is segmented into non-overlapping blocks, each block being of size n by n pixels. Smaller values of n mean that it is more likely that only a single edge will be found in any given block. It also means that more individual blocks will be available for the correlation process. Larger values of n mean that larger, and therefore more robust, insertions can be made. In practice a good choice of n is 8. The block axis conventions used in segmenting the frame are .shown in FIG. 2.

Figure 3:
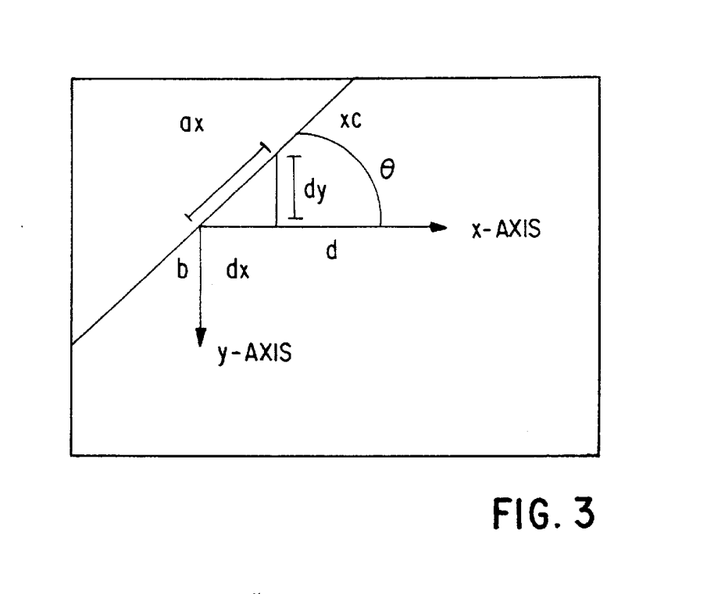
FIG. 3 illustrates the calculation of the local orientation for each point in the frame from four surrounding points according to the present invention.

Referring to FIG. 3, the local orientation for each point in the frame is calculated from four surrounding points by a process as described below. This gives a vector at each point in the frame, with the magnitude of the vector representing the strength of the feature, and the angle representing twice the local orientation. This is illustrated in FIG. 3. Thus the local orientation gives a measure of gradient of luminance in a particular direction within the block. A very large value of orientation indicates the existence of an edge; In this double angle form the vectors can be vector averaged over a block to give the local orientation for the block. This provides a relatively fast estimating algorithm.

e.g, as shown in FIG. 3:

$\theta \sim -45$ degrees: by convention, $\theta$ is associated with point $a=(x,y)$ $-dx \sim 0.7$ $-dy \sim -0.7$ $\theta$ is estimated from $a = r(x, y)$ $b = r(x, y+1)$ $c = r(x+1, y)$ $d = r(x+1, y+1)$ $e = d - a$ $f = b - c$ $Re = -2 * e * f$ $Im = e^2 - f^2$ $\theta = \frac{1}{2} \text{Tan}^{-1}\left(\frac{Im}{Re}\right)$ $\theta$ is in single angle form
Re,Im are in double angle form
orientations are averaged in the Re,Im double angle form.

Figure 4:
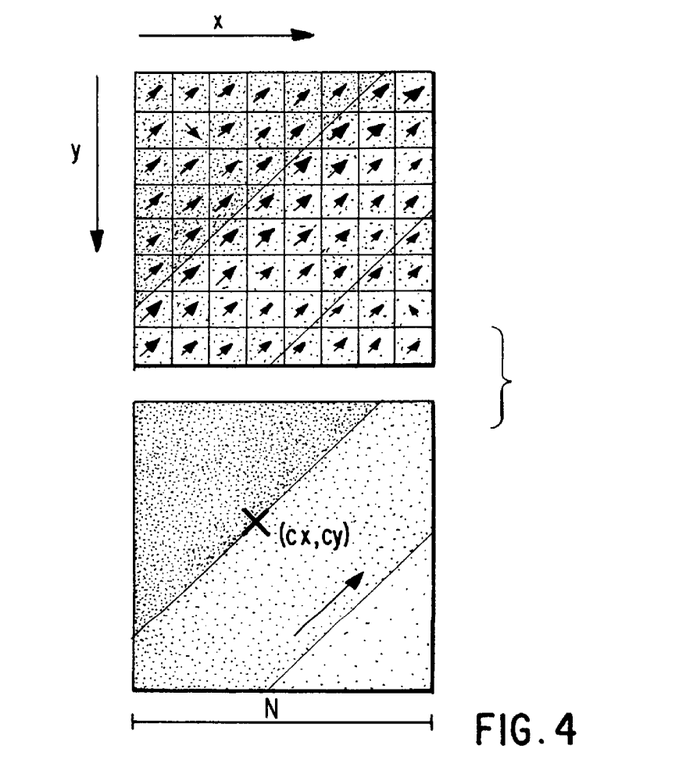
FIG. 4 illustrates the calculation of the average block vector by summing the local vectors for the block.

The calculation of the average block vector is simply a matter of summing the local vectors for the block, as shown in FIG. 4. A large average block vector indicates a strong edge running through the block. The average energy in the block can be calculated by summing the magnitudes of the individual vectors. From these two figures, the local block orientation can be calculated by taking ½ the angle of the block vector, and a measure of block consistency calculated by taking the ratio of the magnitude of the block vector to the block energy.

Figure 5A:
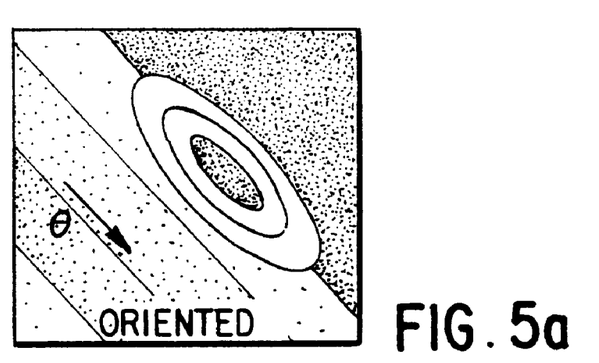
FIGS. 5a–c illustrate how the consistency measure is used to distinguish between blocks having a consistent orientation from those having an inconsistent orientation.
Figure 5B:
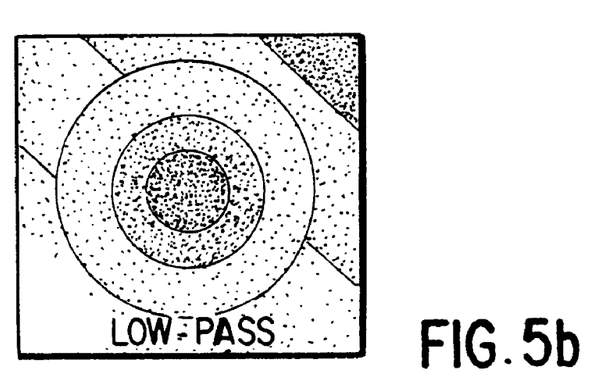
Figure 5C:
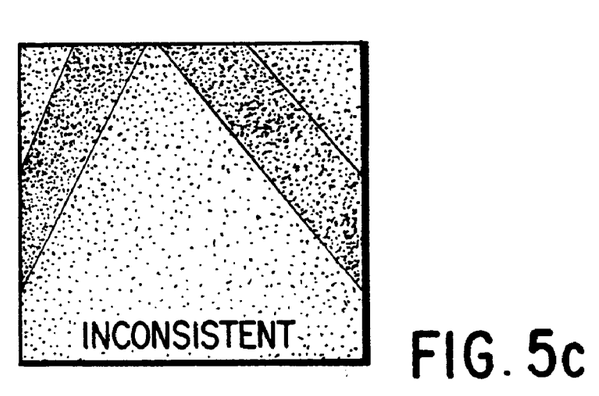

The local energy can be used to distinguish between blocks which have small activity (little variations in image)

and blocks which have some activity. The consistency measure can be use to distinguish between blocks which have a consistent orientation and these which have a inconsistent orientation. This allows the blocks to be split into three categories as shown in FIG. 5.

For blocks with a consistent local orientation a centre of the edge needs to be calculated. The method is shown below with reference to FIG. 4. Each individual vector is resolved into a component in the same orientation as the block orientation. Then the local centroid of these components is calculated in the orthogonal axis of the local orientation. This local centroid is the centre of the edge which is used to centre the insertion on the edge. During the calculation a variance is also calculated, which is used to determine if there are two edges in the same block, in which case the block is classified as inconsistent, and no insertion is made. This is to prevent the insertion being made half way between the two edges. An alternative strategy in this case would be to split the insertion and make two insertions, calculating the centres by a binary splitting local centroid algorithm.

Referring to FIG. 4, the orientations are held as the real Re(x.y) and imaginary Im(x,y) components of the double angle form they are averaged in this form $$Re\_A = \sum_{x,y} Re(x, y)$$

$$Im\_A = \sum_{x,y} Im(x, y)$$

The energy of the block is calculated from $$\text{Strength} = M\_A(k, l) = \sum_{x,y} \text{sqrt}(Re(x, y), Im(x, y))$$

The local block orientation is calculated from $$\theta(k, l) = \frac{1}{2}\text{Tan}^{-1}\left(\frac{Im\_A}{Re\_A}\right)$$

The block consistency is calculated from $$\beta(k, l) = \frac{\text{sqrt}(Re\_A * Re\_A + Im\_A * Im\_A)}{M\_A(k, l)}$$

To calculate the centre point c(x,y)
translate coordinates to centre of block $$x1 = x - \frac{N}{2}$$

$$y1 = y - \frac{N}{2}$$

rotate axis to local orientation $$x2 = dx*x + dy*y$$

$$y2 = -dy*x + dx*y$$

calculate component of activity in block orientation $$r = dx*\sin(\theta(x, y)) + dy*(-\cos(\theta(x, y)))$$

calculate local centroid of components $$1cx = \frac{\sum_{x,y}(r*x2)}{\sum_{x,y}(r)}$$

$$1cy = \frac{\sum_{x,y}(r*y2)}{\sum_{x,y}(r)}$$

rotate and translate coordinates back $$cx = dx*1cx - dy*1cy + \frac{N}{2}$$

$$cy = dy*1cx + dx*1cy + \frac{N}{2}$$

also calculate a variance figure $$\text{var} = \frac{\sum_{x,y}(r*y2*y2 - 1cy*1cy)}{\sum_{x,y}r}$$

FIG. 5 illustrates how the different block types are processed. The oriented blocks are given an elliptical insertion aligned with the edge within the block. The strength of the insertion is scaled by the energy within the block. The low energy blocks have a circular insertion, centred on the centre of the block, and with a fixed strength. They may also have a small dither to prevent contouring. Inconsistent blocks have no insertion.

Figure 6:
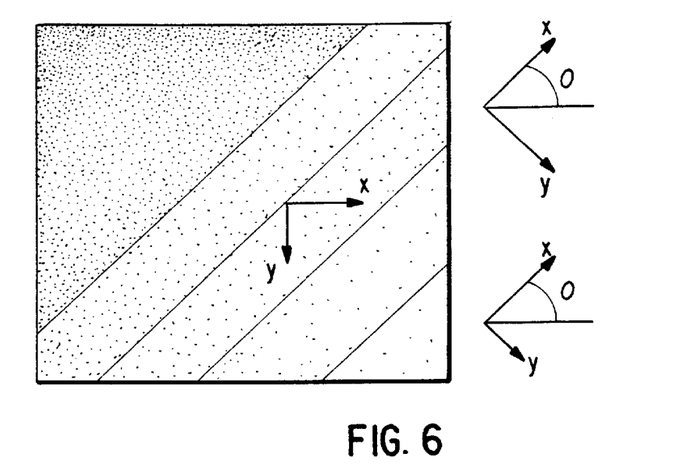
FIG. 6 illustrates the calculation of the elliptical insertion function for each point within the block.

The elliptical insertion function is calculated for each point within the block based on its distance from the centre point, by rotating to align a local axis with the block orientation, and scaling the y-axis to produce an elliptical rather than circular function, as shown in FIG. 6. The cross sectional function of the insertion is a ½ cycle of a cos function. This insertion function is then used to weight the concave/convex-ness of the individual points, so as to limit the extent of the insertion.

Referring to FIG. 6, the insertion function is calculated as follows. Calculate the distance vector between point (x,y) and point (cx,cy)

$$x1 = x - cx$$

$$y1 = y - cy$$

Rotate the local axis to align with the local block orientation $$x2 = dx*x1 + dy*y1$$

$$y2 = -dy*x1 + dx*y1$$

scale the y axis to produce an elliptical function in distance $$y3 = y2*\text{ratio}$$

calculate the radial distance of the point (x,y)

$$d = \frac{\sqrt{x2^2 + y3^2}}{MAX\_d}$$

calculate the insertion function if $(d>1)d=1$ $i(x,y)=0.5*(\cos(d*\pi)+1)$

The insert function is appropriately scaled by the block energy factor, M_A: Whilst the scaling may be a simple proportionality factor, other scalings may be envisaged. In general, the scaled insert factor, $i_S$, may be represented as:

$i_S(x,y)=f(i(x,y), M\_A)$

Figure 7:
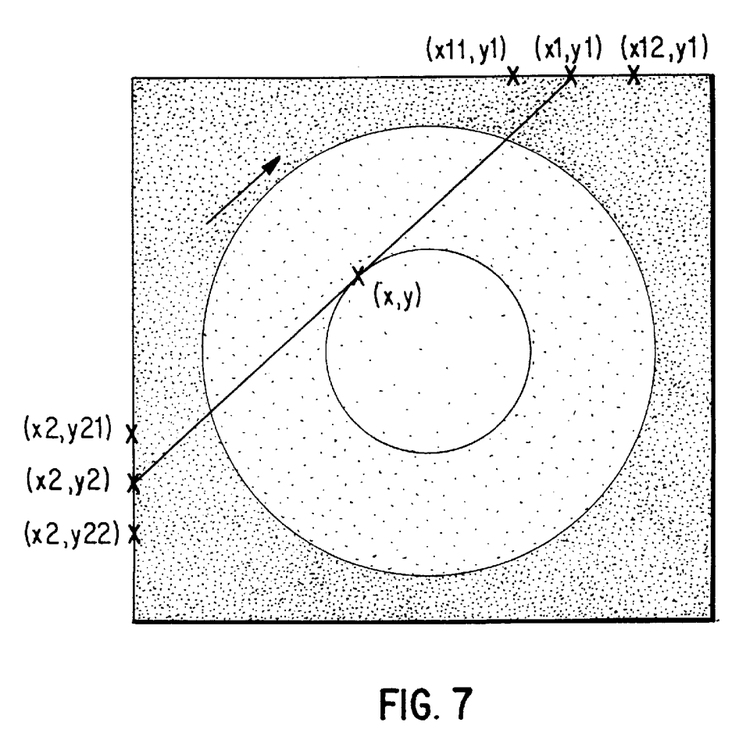
FIG. 7 illustrates the calculation of the convex/concaveness of a block.

The calculation of the convex/concave-ness of a block is illustrated in FIG. 7. The edge points of the block are used to estimate the inside points using a linear interpolation in the direction of the block orientation. The difference between the estimated value and the actual value then gives a +ve or -ve number. These numbers are then weighted by the insertion function and summed over the block to give a final +ve or -ve value for the block which indicated its concave or convex-ness.

Referring to FIG. 7, predicted value at point (x,y)

$p(x,y)=Lin(p(x1,y1),p(x2,y2))$ $p(x1, y1)=Lin(r(x11, y1), r(x12, y1))$ $p(x2,y2)=Lin(r(x2,y21),r(x2,y22))$ concave/convexness of point $(x,y)$ $c(x,y)=r(x,y)-p(x,y)$ Overall concave/convexness of block(k,1), when scaled insert function is added:

$$C(k, 1) = \sum_{x,y} c(x, y) * i_s(x, y)$$

The measure C of block concavity is a significant factor which is computed during the encoding process, and is employed during the decoding process to derive the inserted code.

In the encoding process, the measure C is computed, and a further factor is computed from C, as will be explained in more detail below to determine by how much the scaled insert function should be further scaled to produce the desired value of C in the individual encoded pixels which are transmitted.

In the decoding process, the existing concavity C of the image block is assessed (which will include the inserted scaled insert function ), and to this is added the concavity of the predicted insert function $i_S$. A correlation process is then employed to determine whether an insert function exists within the image.

By way of example, in a decoding process, measures of block concave/convex-ness are combined across a predefined set of blocks in order to produce a reliable result for each bit. For example the measures from 4 successive lines of blocks can be combined to produce each bit. The combination is done by correlating to one of two different pseudo-random sequences as shown below. The elements of the PRS are multiplied by the measures for successive blocks, and the results accumulated. this is done for both sequences. Then the largest of the two determines which bit is decoded, and ratio of the largest correlating value to the maximum possible one gives a measure of confidence that the correlation is correct. Note that a measure of confidence is only reliable for a large number of blocks.

EXAMPLE two correlation sequences e.g.
Zero: +1, −1, +1, +1, −1, +1, +1, +1, −1, −1, +1
One: −1, −1, −1, +1, +1, −1, +1, −1, +1, −1, +1
correlated with C(x,y) e.g.
C(x,y): +0.2, −0.9, +0.1, etc . . .
zero gives: (+1)*(+0.2)+(−1)*(−0.9)+(+1)*(+0.1)=+1.2
one gives: (−1)*(+0 . . . 2)+(−1)*(−0.9)+(−1)*(+0.1)=+0.6
sum gives: (+0.2)+(+0.9)+(+0.1)=+1.2
Maximum of zero or one determines 0 or 1 bit decision
e.g. zero =+1.2 gives a 0 bit
100*(zero/sum) gives measure of confidence as a number up to a maximum of 100
e.g. 100* (zero/sum)=100

Figure 8A:
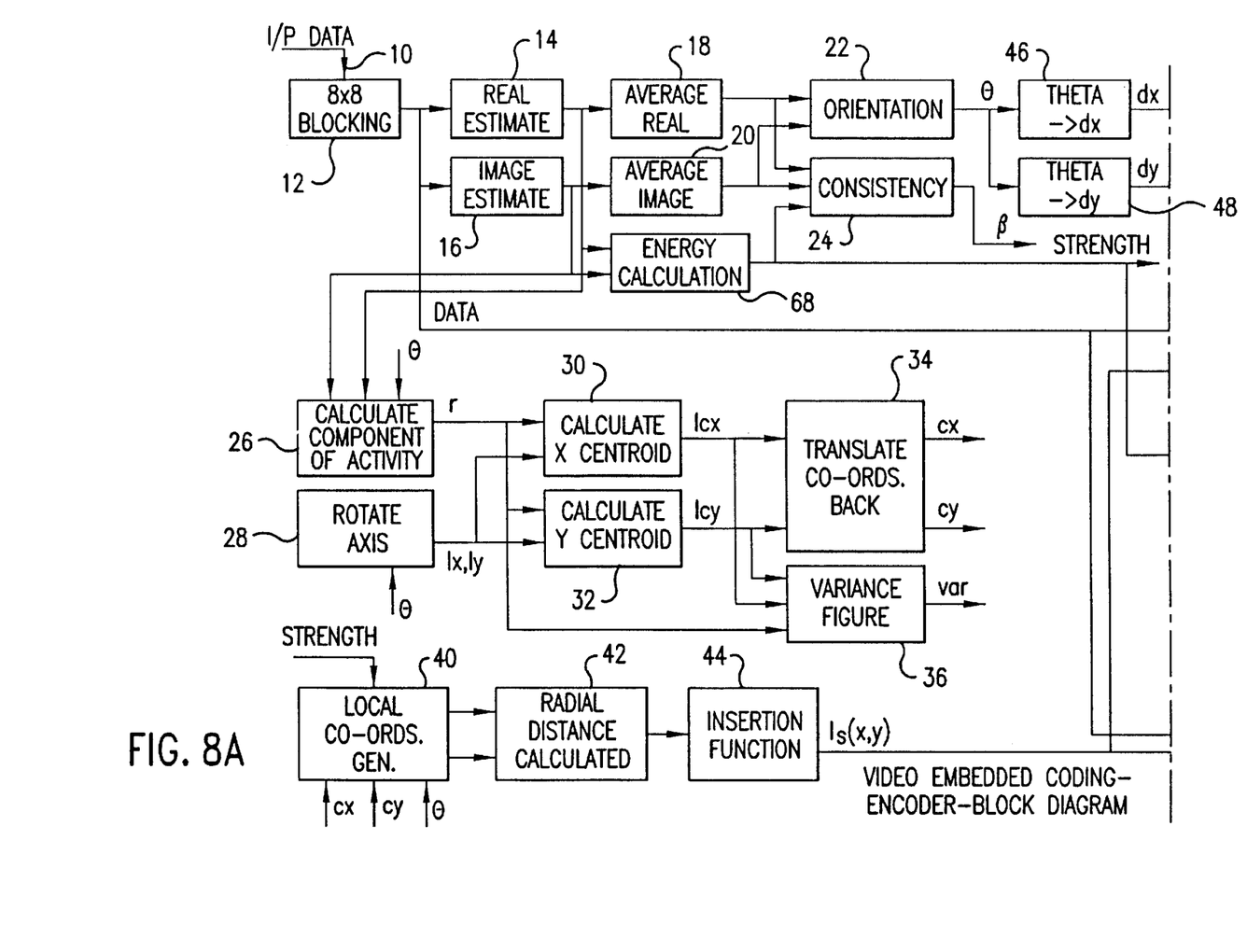
FIGS. 8 and 9 are block diagrams of a preferred embodiment of apparatus of the present invention, illustrating an encoder and decoder, respectively.
Figure 8B:
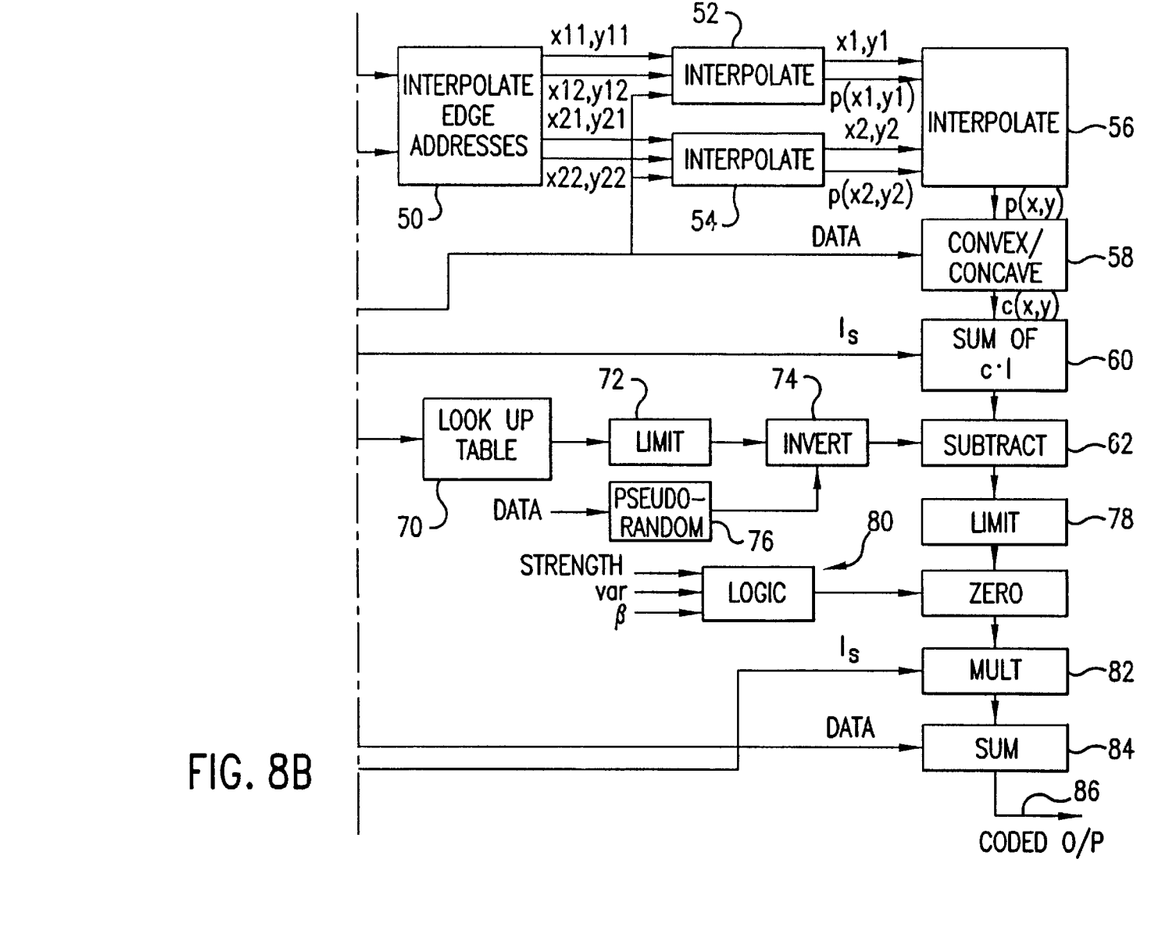

Referring now to FIG. 8 which shows an encoder for encoding video images, video data is input on line 10 to an 8×8 blocking device 12, which performs the operation shown in FIG. 2 of dividing the input data into blocks each of 64 pixels. The block data DATA is then passed to two devices 14, 16 for estimating the local orientation of each point within the block and giving the real component Re_A of the orientation and the imaginary component Im_A of the orientation by a process of interpolation described with reference to FIG. 3. The values are averaged in summing devices 18, 20 to give average values for the block and from these average values, the block orientation 6 is calculated as at 22 by dividing the angle of the block vector by two as described with reference to FIG. 4. Signals Im_A and Re_A are applied as inputs to an energy calculation unit 68 which generates a signal Strength, representing the energy or strength of the featured regions in the block, in the manner described with reference to FIG. 4. A measure of the consistency of orientation in the block is obtained as at 24 by taking the ratio of the magnitude of the block vector to the block energy. This provides an output β which is applied to a logic unit 80 to be described. The block orientation unit 22 output θ is applied to devices 26, 28 together with the individual values of each vector from units 14,16 in order to perform the calculation described with reference to FIG. 4 of calculating for each vector the component of activity parallel to the axis of the block orientation. In addition, device 28 rotates the coordinates of the vectors to be parallel with the block orientation vector. The centroid of the components is computed as at 30, 32 and outputs 1cx, 1cy are applied to unit 34 which is operative to translate the components back to the original x, y axes and provide centroid components cx, cy. In addition device 36 calculates a variance figure var as described with reference to FIG. 4.

Devices 40, 42, 44 receive signals cx, cy, the block orientation θ, and the Strenoth signal. Devices 40, 42, 44 are operative to calculate the elliptical insertion function i as described with reference to FIG. 6. The Strength signal is employed to scale the insert function and produce a scaled insert function $i_S$. The insertion function is employed to weight the amount of luminance applied to each pixel dependent on its radial position with reference to the edge centre.

Devices 46, 48, 50, 52, 54, 56 are employed to interpolate the pixel addresses of the edge and to estimate the existing concavity of the block. Firstly, a point within the block (x,y) is reconstituted from the orientation θ as at 46, 48. As described with reference to FIG. 7, edge addresses x11–x22 are estimated at 50 by a process of interpolation at the edge of the block, and the luminance values $p(x_1, y_1)$, $p(x_2, y_2)$ are then estimated as at 52, 54 by a process of linear interpolation. The luminance of the point p(x, y) is then calculated by a further linear interpolation as at 56. The difference c(x, y) between the actual value r(x, y) and the estimated value p(x, y) is then found in subtractor 58. The value c(x, y) weighted by the insertion function i(x, y) and summed at 60 over the entire block gives a sum value C(k,1) representing the concavity of the entire block as described above.

As mentioned above, this value is employed directly in the decoding process. In the encoding process, this value is employed, as will now be described, to determine the weighting to be applied to the luminance of individual pixels. A value is derived representing the maximum strength of the insert which will not risk the insert becoming visible. This value is derived from a look up table 70 which is accessed by the Strength signal. The lookup table value is limited as at 72 and modulated as at 74 by the pseudo random code bit to be applied to the block. The result is then subtracted from the overall concavity figure C in subtractor 62. The result of the subtraction gives a multiplying factor representing by how much the insert function must be adjusted to give the appropriate luminance value for individual pixels. This value is limited at 78. If the multiplying factor is too great, creating the risk of a visible artefact, then the limiter 78 will return a maximum value only.

The multiplying factor is subject to a logical function at 80 which receives a control input from a logic block 81, which thresholds and combines inputs comprising the consistency angle β, the variance var, and the signal Strength from unit 68 to indicate whether the block is a suitable block for containing data. Effectively the units 80, 81 perform the function indicated in FIG. 5 to assess whether the block is suitable for code insertion.

The scaled insert function $i_S$ is multiplied at unit 82 with the multiplying factor and summed at 84 on a pixel-by-pixel basis with the input data from unit 12 to provide a coded output signal as at 84.

In the case where the block is unsuitable for code insertion along an edge in that the Strength signal indicates that the block is of low activity as exemplified in FIG. 5b, then units 40–44 are adapted to compute a circular insert function. In the case where as indicated in FIG. 5a, insertion along an edge is possible, then units 40–44 compute the elliptical insertion function is defined above with reference to FIG. 6.

Figure 9A:
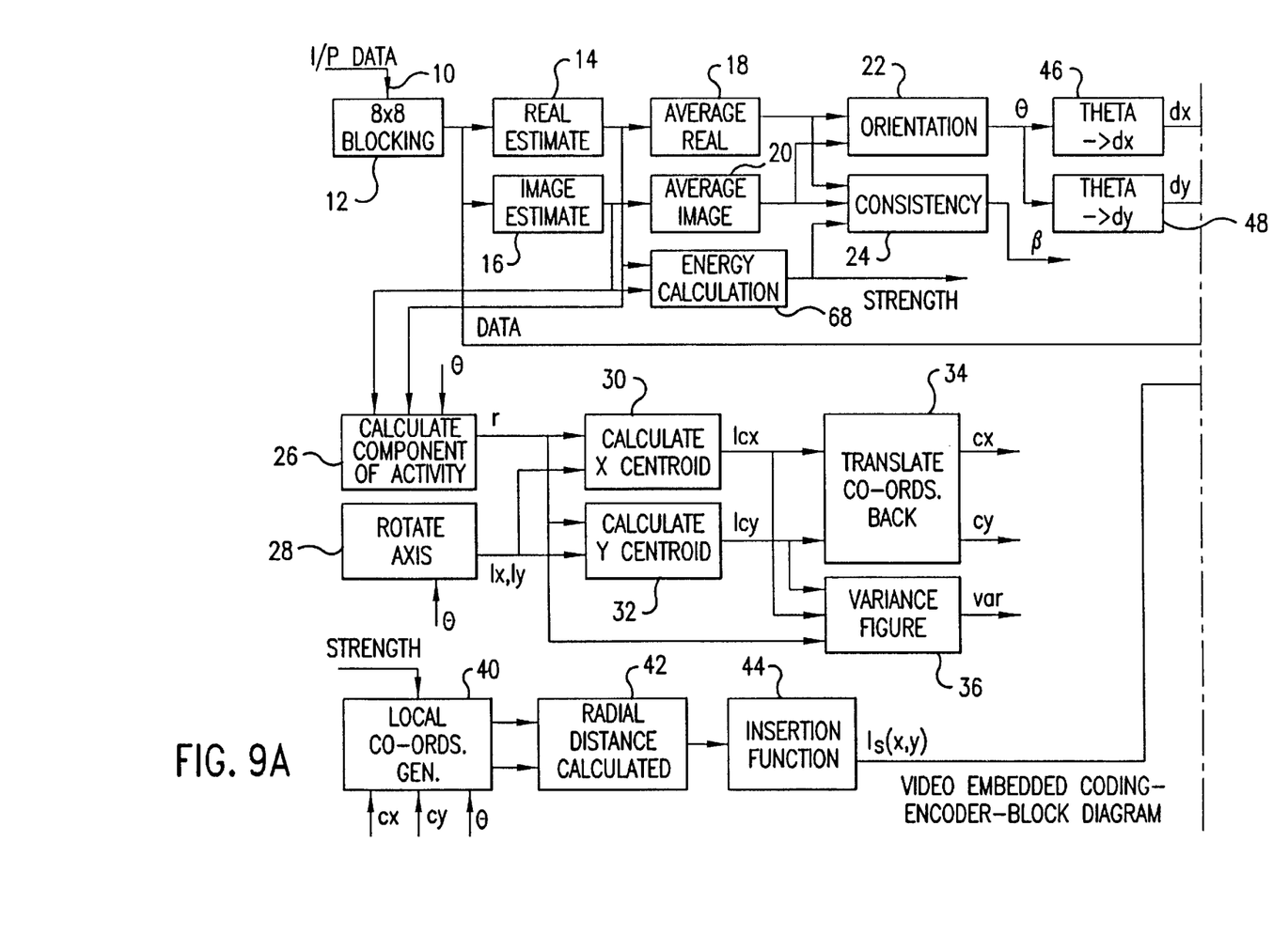
Figure 9B:
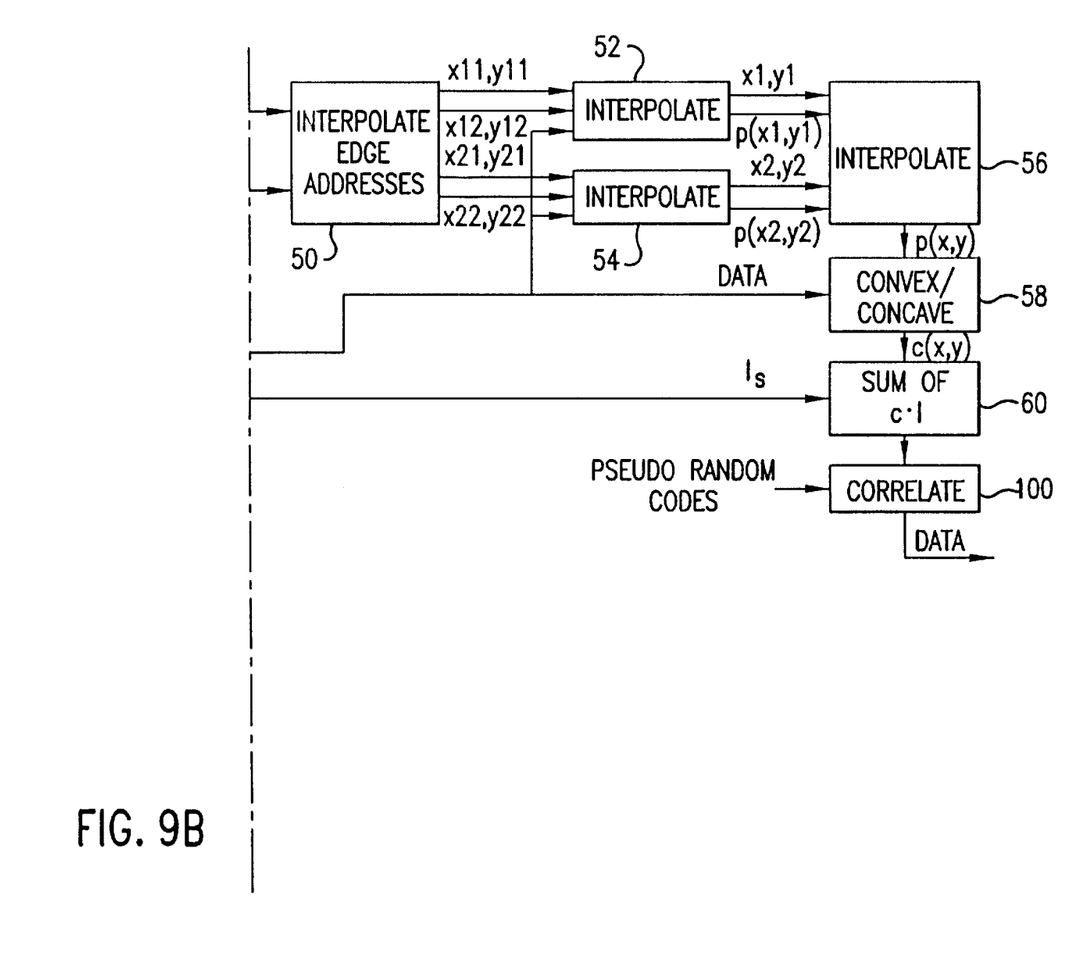

Referring now to FIG. 9, the decoding section which receives the coded output from the encoder operates in a very similar manner and similar units are indicated by the same reference numeral. The essential difference is that units 70–82 of the encoder are omitted and are replaced in the decoder by unit 100, which is operative to perform the correlation function outlined above (see EXAMPLE) with the pseudo random codes in order to decode the data. Thus the decoder computes the overall concavity of the block as at 58, and the anticipated scaled insert function $i_S$ These values are summed as at 60 to give a value for the whole block, and a correlation is performed in unit 100 with the two pseudo random codes representing the two possible binary values.

Whilst the above has been described as a preferred embodiment, other embodiments may be implemented. For example an embodiment will now be described for encoding textured regions.

Encoder

1. An image is to be encoded containing textured regions comprising a random mixture of small localised areas having different chrominance values. For each block of the M×N blocks of the image, the texture statistical parameters are calculated by a cluster analysis process which produces clusters of chrominance values and the variance values for each cluster. The number of clusters and cluster variances are used to identify blocks which consist of two (or more) basic chrominance values (colours) which are distributed in a random or relatively random pattern. The computed statistical parameters are used to identify the more intense "foreground" value. A threshold is set based on the statistical parameters, and used to identify pixels within each block which belong to the foreground value.

2. A circular function centered on the centre of the sub-bit block, with a maximum value at its centre and tapering to zero with an appropriate cross-sectional function, a ½ wave raised cosine function, is calculated. The magnitude of the circular function is set from the cluster statistics (by means of empirical measurements), to maximise the insertion strength whilst limiting visibility. It is also limited by the existing concavity/convexity of the sub-bit block, which is calculated as in the above described embodiment.

3. The insertion function thus calculated is applied to adjust the cluster value in a positive or negative manner depending on the existing concavity, according to the required sign. The adjustment is made only to those pixels which have been identified as part of the foreground value.

Decoder

1. As with step 1. of the Encoder, the statistical parameters of the sub-bit block are calculated to identify the "foreground" pixels.

2. For each identified foreground pixel, the distance from the centre of the sub-bit block (circular insert function) is calculated.

3. All different combinations of pairs Pi of foreground pixels are determined, and for each pair Pi the nearer pixel to the centre is calculated. The difference in the intensity values Vi of each pair is computed by subtracting the value of the pixel nearer the centre from the value of the pixel further from the center. The difference Di in the istances of the pixels of each pair from the centre is also calculated.

4. A factor C is now computed=$\Sigma_i$Vi*Di

5. C is now the estimate of concavity and is used as in the main embodiment as described above.

What is claimed is:

1. A method of inserting coded information into an image, comprising analyzing the image, identifying at least one strongly featured region, and inserting into the or each such region a predetermined geometric insert function extending spatially within such region, in order to represent coded information, wherein said method includes determining the maximum strength said insert function may have without producing a visible artefact, and determining the intensity of the insert function in accordance with said maximum strength.

2. A method according to claim 1, including assessing the image as to the degree of strength of the strongly featured region within the image, and determining said maximum strength in dependence on such strength assessment.

3. A method according to claim 2, including varying in a predetermined manner the intensity of the geometric insert function over its spatial extent, determining a function representing the extent to which the intensity of the image varies in a similar manner, and determining the product of such function and the geometric insert function.

4. A method according to claim 3, wherein the geometric insert function varies in intensity in a concave manner between its edges and across its central region.

5. A method according to claim 3, wherein the intensity of the insert function is scaled by a value representing the difference between said maximum strength and said product.

6. A method according to claim 1, wherein the insert function varies in intensity over its spatial extent in a concave manner, either increasing or decreasing in intensity from its centre towards its edges to represent either one of two binary values.

7. A method of inserting coded information into an image, comprising analyzing the image, identifying at least one strongly featured region, and inserting into the or each such region a predetermined geometric insert function extending spatially within such region, in order to represent coded information, wherein said method includes determining whether the strongly featured region is sufficient well defined to permit insertion of coded information.

8. A method of inserting coded information into an image, comprising analyzing the image, identifying at least one strongly featured region, and inserting into the or each such region a predetermined geometric insert function extending spatially within such region, in order to represent coded information, further comprising dividing the image up into blocks formed in N rows and M columns, and carrying out the aforesaid analysing and inserting steps in each block.

9. A method according to claim 8, wherein a group of blocks, selected according to a predetermined rule, are encoded according to a pseudo random sequence so that one element in the sequence represents one item of coded information which is inserted into a respective block of the group.

10. A method of inserting coded information according to claim 8, wherein an assessment is made of the type of image within each block, whether it has a single strongly featured region, has several such regions, or is a block having low activity in terms of image information.

11. A method according to claim 10 wherein if a block is assessed to have a low activity, the geometric insert function comprises a geometric region wherein the pixels within the region have a luminance modulated according to a predetermined function.

12. A method of decoding information contained in an image, the method comprising analysinq the image, identifying a strongly featured region, determining for the region a predetermined geometric insert function extending spatially within the region and representing coded information, and performing a correlation operation with such predetermined insert function and the image to determine the value of coded information inserted into the strongly featured region, wherein the method further comprises dividing the image up into blocks formed in N rows and M columns, and carrying out the aforesaid decoding steps in each block.

13. A method according to claim 12, wherein the intensity of the anticipated geometric insert function varies in a predetermined manner overs its spatial extent, and determining a function representing the extent to which the intensity of the image varies in a similar manner, determining the product of such function and the geometric insert function, and correlating such product with the possible values of the coded information to determine the most likely value.

14. A method according to claim 12, wherein a group of blocks, selected according to a predetermined rule, are correlated with the possible values of an anticipated pseudo random sequence, the possible values of each element of the sequence being correlated with a respective block.

15. A method of decoding according to claim 12, wherein an assessment is made of the type of image within each block, whether it has a single strongly featured region, has several such regions, or is a block having low activity in terms of image information.

16. A method of inserting coded information into an image, comprising analyzing the image, identifying at least one strongly featured region, and inserting into the or each such region a predetermined geometric insert function extending spatially within such region, in order to represent coded information, wherein the at least one strongly featured region comprises edge regions between areas of different luminance and/or chrominance.

17. A method according to claim 16, wherein the geometric insert function has an intensity varying in a non-linear manner along a length of the edge, for representing one of two binary values.

18. A method according to claim 17, wherein the insert function is elliptical in extent, with its intensity gradually changing in a direction along its major axis, and with its major axis extending along the length of the edge.

19. A method according to claim 18, wherein the elliptical function is centred on the centre of the edge.

20. A method of inserting coded information into an image, comprising analyzing the image, identifying at least one strongly featured region, and inserting into the or each such region a predetermined geometric insert function extending spatially within such region, in order to represent coded information, wherein the at least one strongly featured region comprises textured regions having randomly distributed therein local areas of different luminance and/or chrominance values.

21. A method according to claim 20, comprising analysing a textured region by a process of cluster analysis, identifying a cluster of local areas with a certain quality and which are more prominent to the eye than other local areas, and modifying the chrominance and/or luminance values of the cluster with a geometric insert function which decreases in intensity from its centre, for representing one of two binary values.

22. Apparatus for inserting coded information into an image, comprising means for analyzing the image and identifying strongly featured regions, and means for inserting into at least one such region a predetermined geometric insert function extending spatially within such region and representing coded information, and further including means for determining the maximum strength the insert function may have without producing a visible artefact, and means for determining the intensity of the insert function in accordance with said maximum strength.

23. Apparatus according to claim 22, including means for assessing the image as to the degree of strength of the strongly featured region within the image, and means for determining said maximum strength in dependence on such strength assessment.

24. Apparatus according to claim 23, wherein the intensity of the geometric insert function varies in a predetermined manner overs its spatial extent, and including means for determining a function representing the extent to which the intensity of the image varies in a similar manner, and means for determining the product of such function and the geometric insert function.

25. Apparatus according to claim 24, including means for scaling the intensity of the insert function by a value representing the difference between said maximum strength and the existing variation product.

26. Apparatus for inserting coded information into an image, comprising means for analyzing the image and identifying strongly featured regions, and means for inserting into at least one such region a predetermined geometric insert function extending spatially within such region and representing coded information, and further including means for dividing the image up into blocks formed in N rows and M columns, and carrying out the aforesaid analysing and inserting steps in each block.

27. Apparatus according to claim 26, including means for selecting a group of blocks according to a predetermined rule, and means for encoding the group according to a pseudo random sequence so that the blocks in the group represent one or more bits of information.

28. Apparatus for decoding information contained in an image, comprising means for analyzing the image and identifying a strongly featured region, means for determining for the region an anticipated geometric insert function extending spatially within the region and representing coded information, and means for Performing a correlation operation with such anticipated insert function and the image to determine the value of coded information inserted into the strongly featured region, and further comprising means for dividing the image up into blocks formed in N rows and M columns, and means for carrying out the aforesaid decoding steps in each block.

29. Apparatus according to claim 28, wherein the intensity of the anticipated geometric insert function varies in a predetermined manner overs its spatial extent, and including means for determining a function representing the extent to which the intensity of the image varies in a similar manner, means for determining the product of such function and the geometric insert function, and means for correlating such product with the possible values of the coded information to determine the most likely value.

30. Apparatus according to claim 28, including means for correlating a group of blocks, selected according to a predetermined rule, with the possible values of an anticipated pseudo random sequence, the possible values of each element of the sequence being correlated with a respective block.

31. A method of decoding information contained in an image, the method comprising analyzing the image, identifying a strongly featured region, determining for the region a predetermined geometric insert function extending spatially within the region and representing coded information, and performing a correlation operation with such predetermined insert function and the image to determine the value of coded information inserted into the strongly featured region, wherein the strongly featured region comprises edge regions between areas of different luminance and/or chrominance.

32. A method of decoding information contained in an image, the method comprising analyzing the image, identifying a strongly featured region, determining for the region a predetermined geometric insert function extending spatially within the region and representing coded information, and performing a correlation operation with such predetermined insert function and the image to determine the value of coded information inserted into the strongly featured region, wherein the strongly featured region comprises textured regions having randomly distributed therein local areas of different luminance and/or chrominance values.

* * * * *